(12) United States Patent
Shirasaka

(10) Patent No.: US 9,627,931 B2
(45) Date of Patent: Apr. 18, 2017

(54) POWER FEEDING APPARATUS AND POWER FEEDING SYSTEM

(71) Applicant: Kabushiki Kaisha Toshiba, Tokyo (JP)

(72) Inventor: Hideo Shirasaka, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 457 days.

(21) Appl. No.: 14/330,826

(22) Filed: Jul. 14, 2014

(65) Prior Publication Data
US 2015/0137623 A1 May 21, 2015

Related U.S. Application Data

(60) Provisional application No. 61/906,757, filed on Nov. 20, 2013.

(51) Int. Cl.
| | |
|---|---|
| *H05K 7/14* | (2006.01) |
| *H02J 50/90* | (2016.01) |
| *H04B 5/00* | (2006.01) |
| *H02J 50/00* | (2016.01) |
| *H02J 50/10* | (2016.01) |
| *H02J 17/00* | (2006.01) |

(52) U.S. Cl.
CPC .............. *H02J 50/90* (2016.02); *H02J 17/00* (2013.01); *H02J 50/00* (2016.02); *H02J 50/10* (2016.02); *H04B 5/0012* (2013.01); *H04B 5/0037* (2013.01)

(58) Field of Classification Search
CPC .. H02J 17/00; H02J 50/00; H02J 50/10; H02J 50/90; H04B 5/0012
USPC .................................................. 307/104, 149
See application file for complete search history.

(56) References Cited

U.S. PATENT DOCUMENTS

| | | | |
|---|---|---|---|
| 2013/0106197 A1 | 5/2013 | Bae et al. | |
| 2015/0091512 A1* | 4/2015 | Mai | H02J 5/005 320/108 |

FOREIGN PATENT DOCUMENTS

| | | |
|---|---|---|
| JP | 2013-017274 | 1/2013 |
| JP | 2013-046439 | 3/2013 |
| JP | 2013-099249 | 5/2013 |

* cited by examiner

*Primary Examiner* — Carlos Amaya
(74) *Attorney, Agent, or Firm* — Rutan & Tucker, LLP

(57) ABSTRACT

According to the present embodiment, the power feeding apparatus configured to feed power by electric field coupling to a power receiving apparatus having a first and a second electrodes for receiving power arranged along a mounting surface and a protrusion arranged on the mounting surface side includes a power feeder divided into a plurality of small regions having a small electrode respectively, the power receiving apparatus being mounted on the small regions, and a control module configured to supply power to the small electrodes corresponding to the first and second electrodes, wherein the small region in contact with the protrusion sinks when the power receiving apparatus is mounted, and the small region returns to an original position when the power receiving apparatus is removed.

20 Claims, 7 Drawing Sheets

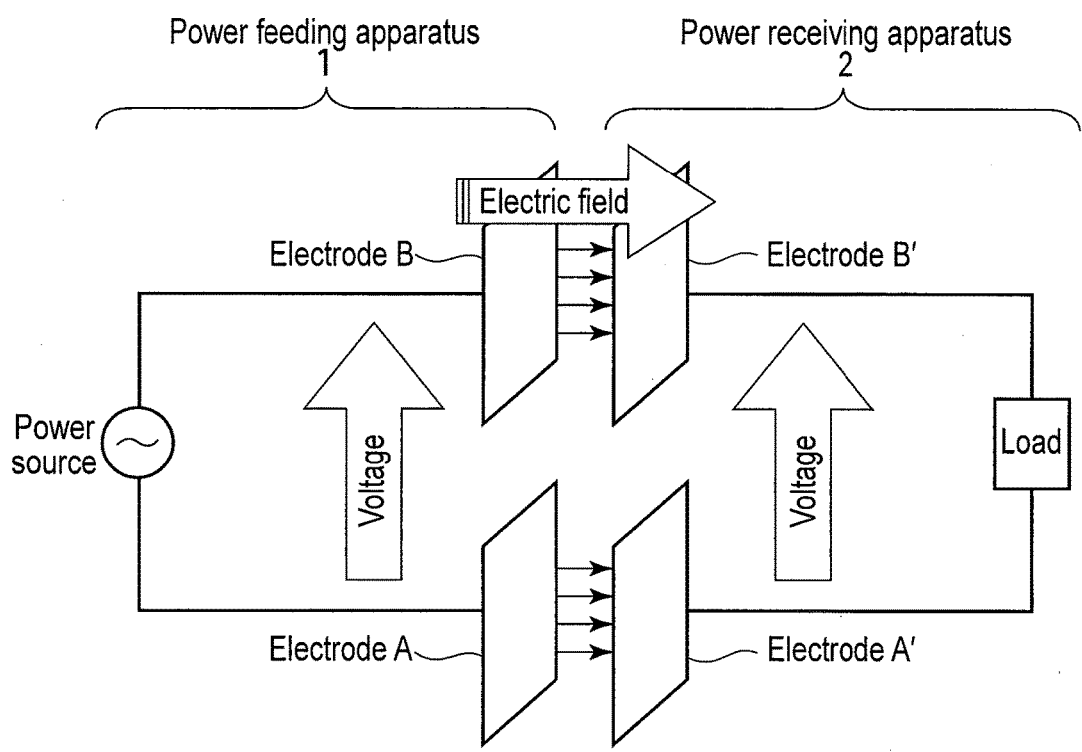
F I G. 1

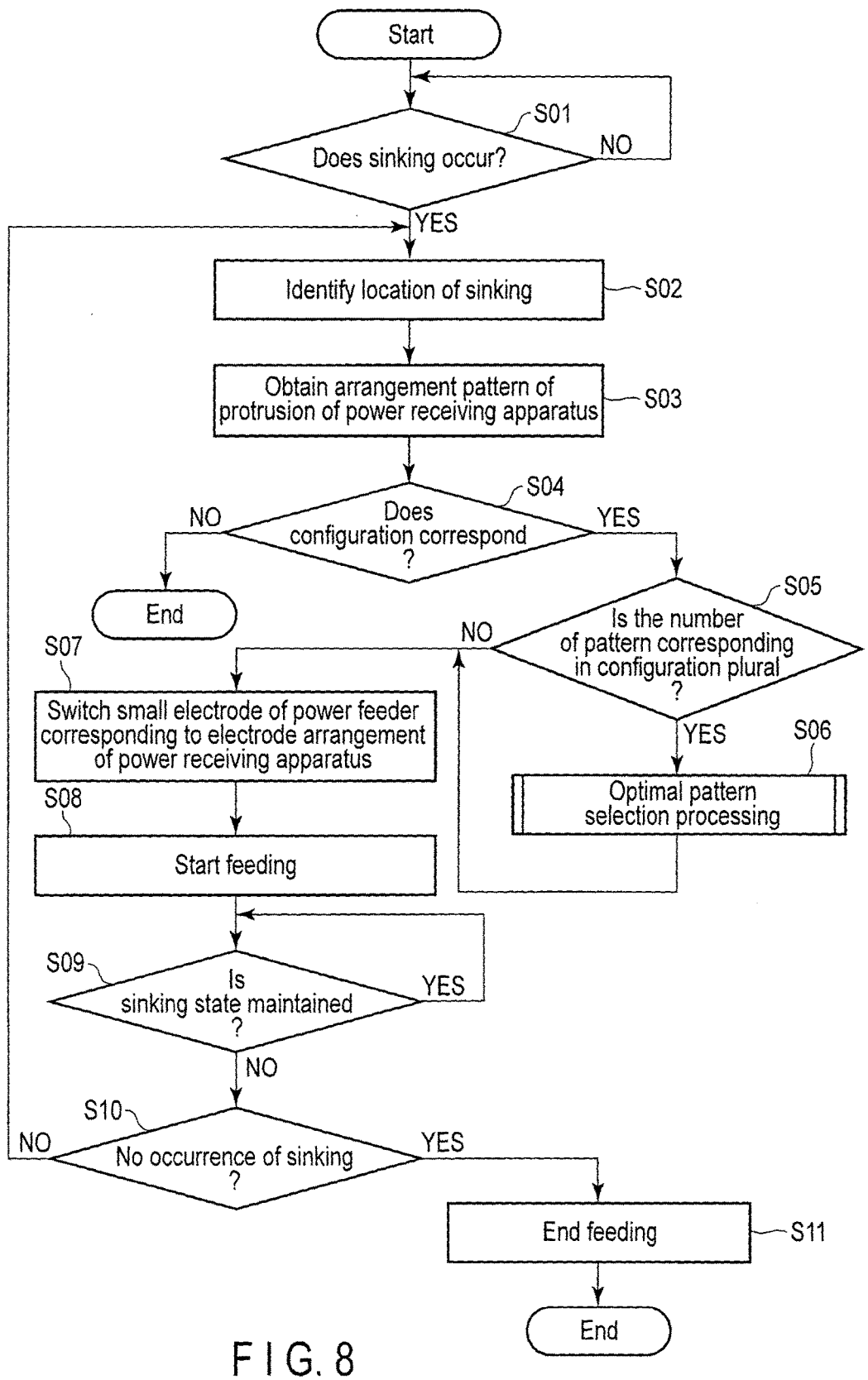
F I G. 8

POWER FEEDING APPARATUS AND POWER FEEDING SYSTEM

CROSS-REFERENCE TO RELATED APPLICATIONS

This application claims the benefit of U.S. Provisional Application No. 61/906,757, filed Nov. 20, 2013, the entire contents of which are incorporated herein by reference.

FIELD

Embodiments described herein relate generally to a power feeding apparatus and a power feeding system.

BACKGROUND

A wireless power feeding technology using electric field coupling is attracting attention as a technology to feed power to electronic apparatuses such as mobile devices and notebook personal computers.

In an electric field coupling method, a power feeding apparatus and a power receiving apparatus are provided with electrodes, respectively. By using an electric field generated between the electrodes, electricity is wirelessly transmitted from the power feeding apparatus to the power receiving apparatus.

An electric field coupling method has the advantage that it is easier to align electrodes than other methods such as an electromagnetic induction method. However, the distance between the electrodes of the power feeding apparatus and the power receiving apparatus affects the efficiency of power transmission: that is, the greater the distance between the electrodes, the worse the efficiency is. Therefore, it is desirable that the distance between the electrodes be small.

On the other hand, the efficiency of power transmission worsens if a protrusion is provided on the bottom of an electronic apparatus (power receiving apparatus) such as a mobile device or notebook personal computer, since the distance between the electrodes of the power feeding apparatus and power receiving apparatus is greater.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram illustrating an electric field coupling method in a power feeding apparatus of the present embodiment.

FIG. 8 is an exemplary flowchart illustrating power feeding operation of the power feeding apparatus of the present embodiment.

DETAILED DESCRIPTION

Various embodiments will be described hereinafter with reference to the accompanying drawings.

The present embodiment provides a power feeding apparatus and a power feeding system capable of feeding power efficiently to a power receiving apparatus whose bottom part is provided with a protrusion.

According to the present embodiment, the power feeding apparatus configured to feed power by electrical field coupling to a power receiving apparatus having a first electrode and a second electrode for receiving power arranged along a mounting surface and a protrusion arranged on a side of the mounting surface, comprising: a power feeder divided into a plurality of small regions having a small electrode respectively, the power receiving apparatus being mounted on the small regions; and a control module configured to supply power to the small electrodes corresponding to the first and second electrodes, wherein the small region in contact with the protrusion sinks when the power receiving apparatus is mounted, and the small region returns to an original position when the power receiving apparatus is removed.

FIG. 1 is an exemplary diagram illustrating an electric field coupling method in a power feeding apparatus of the present embodiment.

A power feeding apparatus 1 and a power receiving apparatus 2 have two electrodes (electrodes A and B) (electrodes A' and B'), respectively. The electrodes A and B of the power feeding apparatus 1 are connected to a power source for feeding power. Load is connected to the electrodes A' and B' of the power receiving apparatus 2. The electrodes A and A' and the electrodes B and B' form capacitors. When the power source supplies an alternating voltage to the power feeding apparatus 1, an electric field is formed between the electrodes and the electrodes opposed with each other are coupled via the capacitor. Therefore, the voltage on the power feeding apparatus side is conveyed to the power receiving apparatus side by capacitive coupling.

Figure 2:
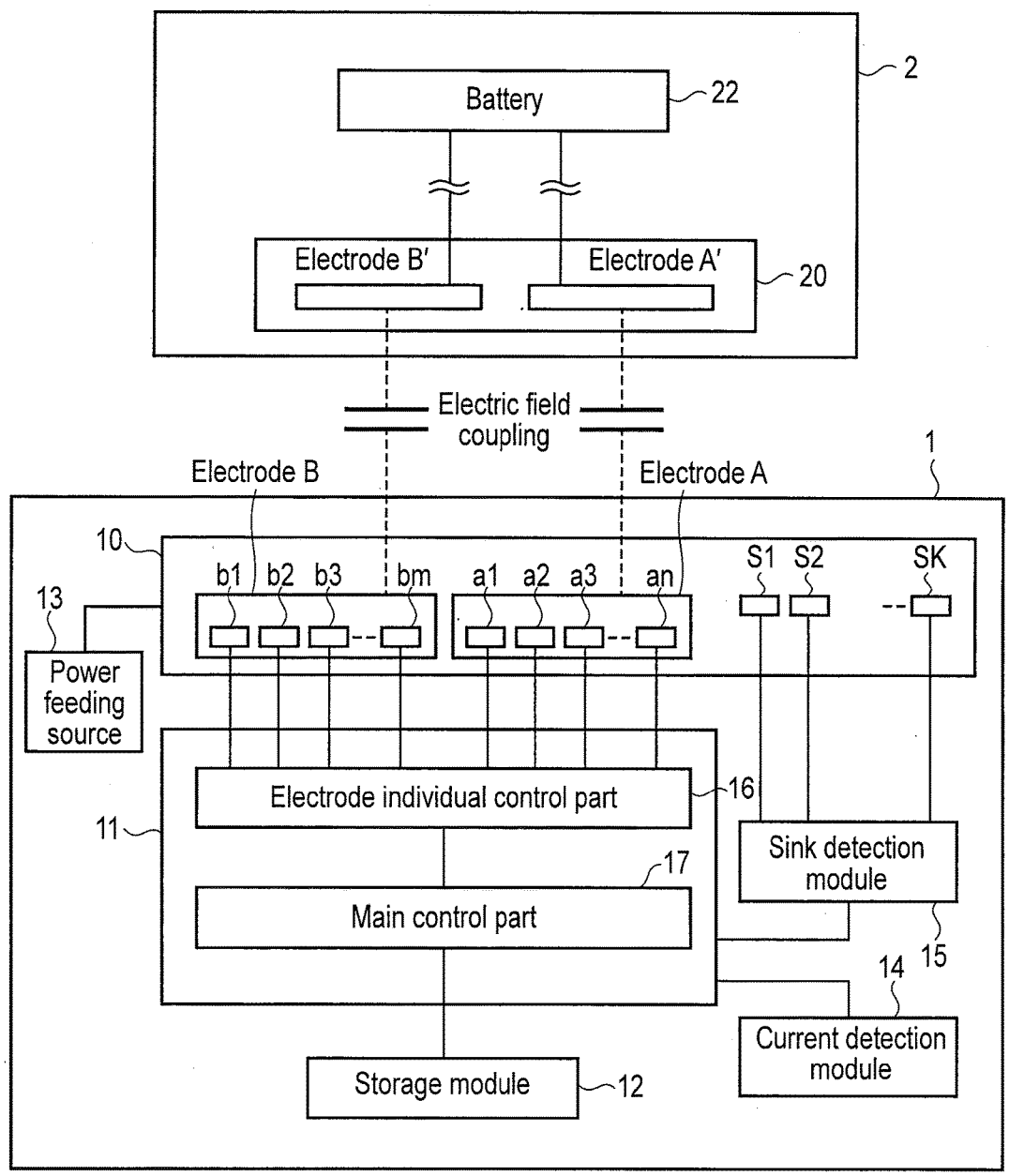
FIG. 2 is an exemplary diagram illustrating a typical structure of the power feeding apparatus of the present embodiment and a structure related to power reception of a power receiving apparatus of the present embodiment.

FIG. 2 is an exemplary diagram illustrating a typical structure of the power feeding apparatus of the present embodiment and a structure related to power reception of the power receiving apparatus of the present embodiment.

The power feeding apparatus 1 comprises a power feeder 10, a control module 11, a storage module 12, a power feeding source 13, a current detection module 14 and a sink detection module 15.

The power feeder 10 is a portion that comprises the electrodes A and B and is opposed to the power receiving apparatus 2. The electrode A includes a plurality of small electrodes a1, a2, . . . , an. The electrode B includes a plurality of small electrodes b1, b2, . . . , bm. Also, there are provided detection sensors s1, s2, . . . , sk configured to detect which portion of the power feeder 10 sinks by mounting the power receiving apparatus 2.

The control module 11 comprises an electrode individual control part 16 and a main control part 17. The electrode individual control part 16 selects the plurality of small electrodes a1, a2, . . . , an and the plurality of small electrodes b1, b2, . . . , bm. The main control part 17 integrally controls the operation of the power feeding apparatus 1.

The storage module 12 stores at least one of the configuration patterns of the power receiving apparatus 2, which is mounted on the power feeder 10. The position of the protrusion on the back surface of the power receiving apparatus 2 and the positions of the electrodes A' and B' are described in the configuration pattern. The power feeding source 13 supplies the electrode A and B with a power source. The current detection module 14 detects a magnitude of an electric current during power feeding and outputs the detected magnitude to the control module 11. The sink detection module 15 detects the condition of the detection sensors s1, s2, . . . , sk and outputs the condition to the control module 11.

The power receiving apparatus 2 comprises a power receiving body 20 and a battery 22.

The power receiving body 20 is a portion that comprises the electrodes A' and B' and is opposed to the power feeder 10. The battery 22 stores charge to supply power to the power receiving apparatus 2. Various kinds of electrical circuits and elements may be provided between the power receiving body 20 and the battery 22, as necessary. For example, a rectifier 21 configured to convert the AC voltage output from the power receiving body 20 into a DC voltage may be provided.

Figure 3:
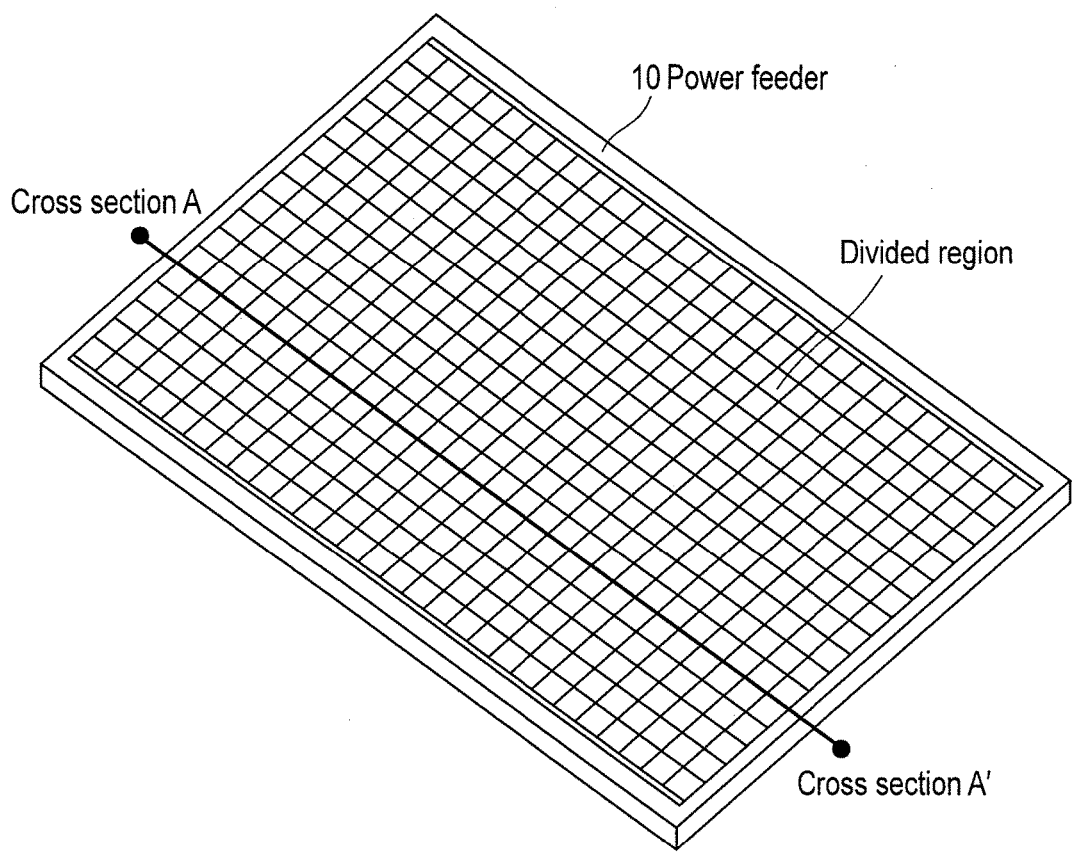
FIG. 3 is an exemplary general perspective view illustrating a power feeder of the power feeding apparatus of the present embodiment.

FIG. 3 is an exemplary general perspective view illustrating a power feeder of the power feeding apparatus of the present embodiment.

The surface on which the power receiving apparatus 2 of the power feeder 10 is mounted is divided into a plurality of small regions. The small region is hereinafter referred to as a divided region. The divided region comprises a small electrode and a detection sensor, respectively.

It should be noted that the area of each of the divided regions do not need to be equivalent. Also, while the divided region is represented as square, its configuration may be hexagon, circle and the like, not limited to square.

Figure 4:
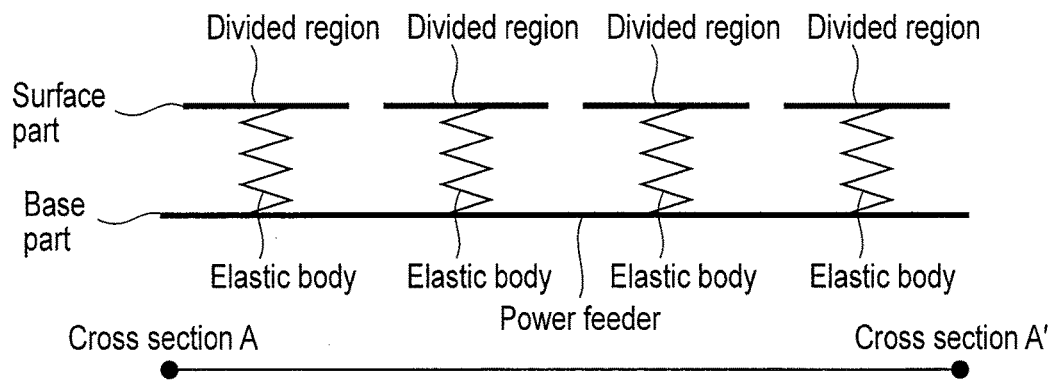
FIG. 4 is an exemplary general sectional view along line A-A' of the power feeder of the power feeding apparatus of the present embodiment.

FIG. 4 is an exemplary general sectional view along line A-A' of the power feeder of the power feeding apparatus of the present embodiment.

The power feeder 10 comprises a base part and a surface part in which the respective divided regions are formed, and the power feeder 10 is provided with an elastic body by each divided region between the surface part and the base part. Therefore, when a pushing force acts, each of the divided regions sinks independently, and when a pushing force disappears, each region returns to the original position.

Figure 5:
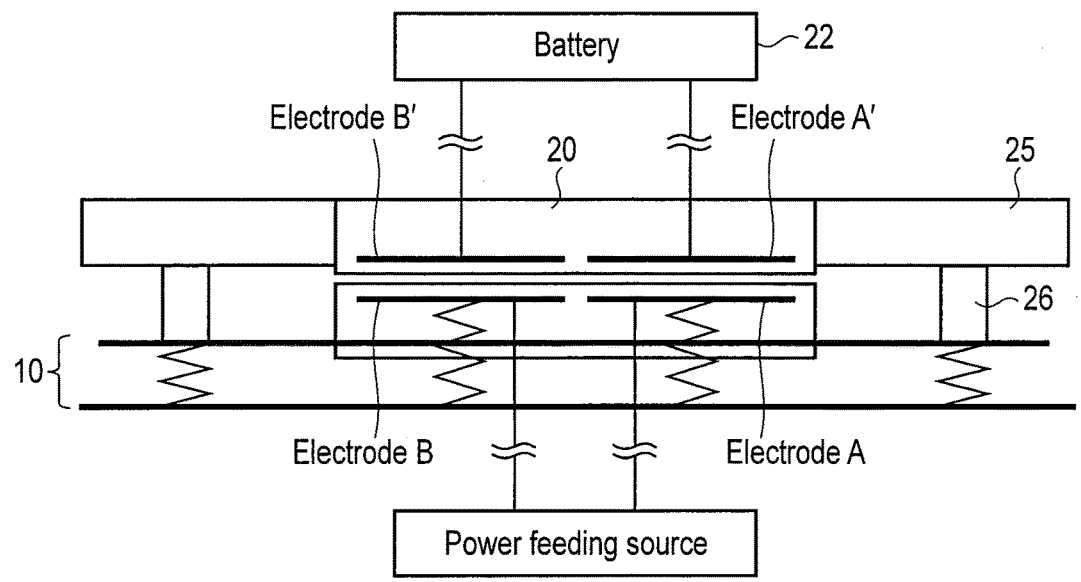
FIG. 5 is an exemplary schematic view illustrating a state where the power receiving apparatus is mounted on the power feeder of the power feeding apparatus of the present embodiment.

FIG. 5 is an exemplary schematic view illustrating a state where the power receiving apparatus is mounted on the power feeder of the power feeding apparatus of the present embodiment.

On a back plate 25 of the power receiving apparatus 2, a plurality of protrusions 26 are arranged to provide a space between the back plate 25 and the contact surface. Therefore, when the power receiving apparatus 2 is mounted on the power feeder 10, the divided region contacting with the protrusion 26 sinks. On the other hand, since the divided region that does not contact with the protrusion 26 keeps unchanged, the surface of the divided region is pressed to the back plate 25 (power receiving body 20) and gets contacted. As a result, the electrode A can be opposed to the electrode A' while the electrode B can be opposed to the electrode B'.

As mentioned above, the distance between the electrodes of the power feeding apparatus 1 and the power receiving apparatus 2 affects efficiency of power transmission: that is, the further the distance between electrodes, the worse efficiency is. According to the inventor's review, it is desirable that the distance between the electrodes be 0.8 mm or less. That such a short distance between the electrodes is required means that efficiency of power transmission varies even when the small distance between the electrodes varies. According to the structures illustrated in FIGS. 3-5, since the surface of the divided region contacts with the power receiving body 20, the distance between the electrodes keeps constant and therefore a desired distance between the electrodes can be realized. Also, since the surface of the divided region and the power receiving body 20 are pressed by the elastic body, it is possible to prevent the variation of the distance between the electrodes.

Figure 6:
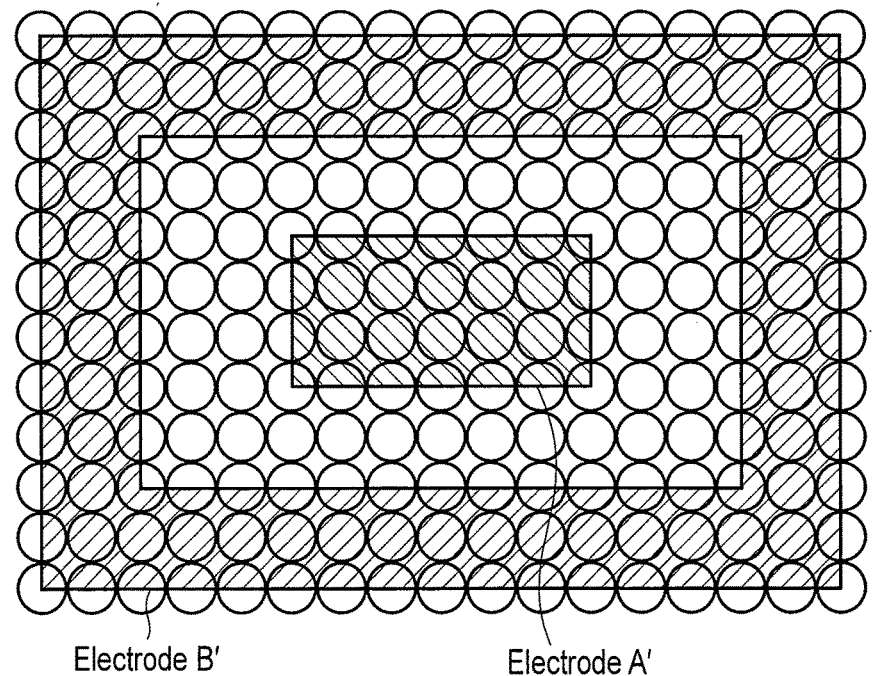
FIG. 6 is an exemplary diagram illustrating an arrangement of a small electrode of the power feeding apparatus and a small electrode of the power receiving apparatus of the present embodiment.

FIG. 6 is an exemplary diagram illustrating an arrangement of a small electrode of the power feeding apparatus and a small electrode of the power receiving apparatus of the present embodiment.

For clear explanation, the small electrode of the power feeder 10 is represented as a circle region while the electrodes A' and B' of the power receiving body 20 are represented as a hatched region. As shown in the FIG. 6, the small electrode whose region is overlapped with the electrode A' can function as the electrode A and the small electrode whose region is overlapped with the electrode B' can function as the electrode B. On the other hand, the small electrode whose region is not overlapped with either of the electrode A' or B' does not need to function as an electrode.

It should be noted that the electrode A' and the electrode B' are not limited to the embodiment illustrated in FIG. 6. For example, it may be possible that the electrode A' is not included in the electrode B' so that the electrode A' and the electrode B' are arranged side by side. Also, the configuration of the electrode A' and B' may be arbitrary, not limited to rectangular.

Figure 7:
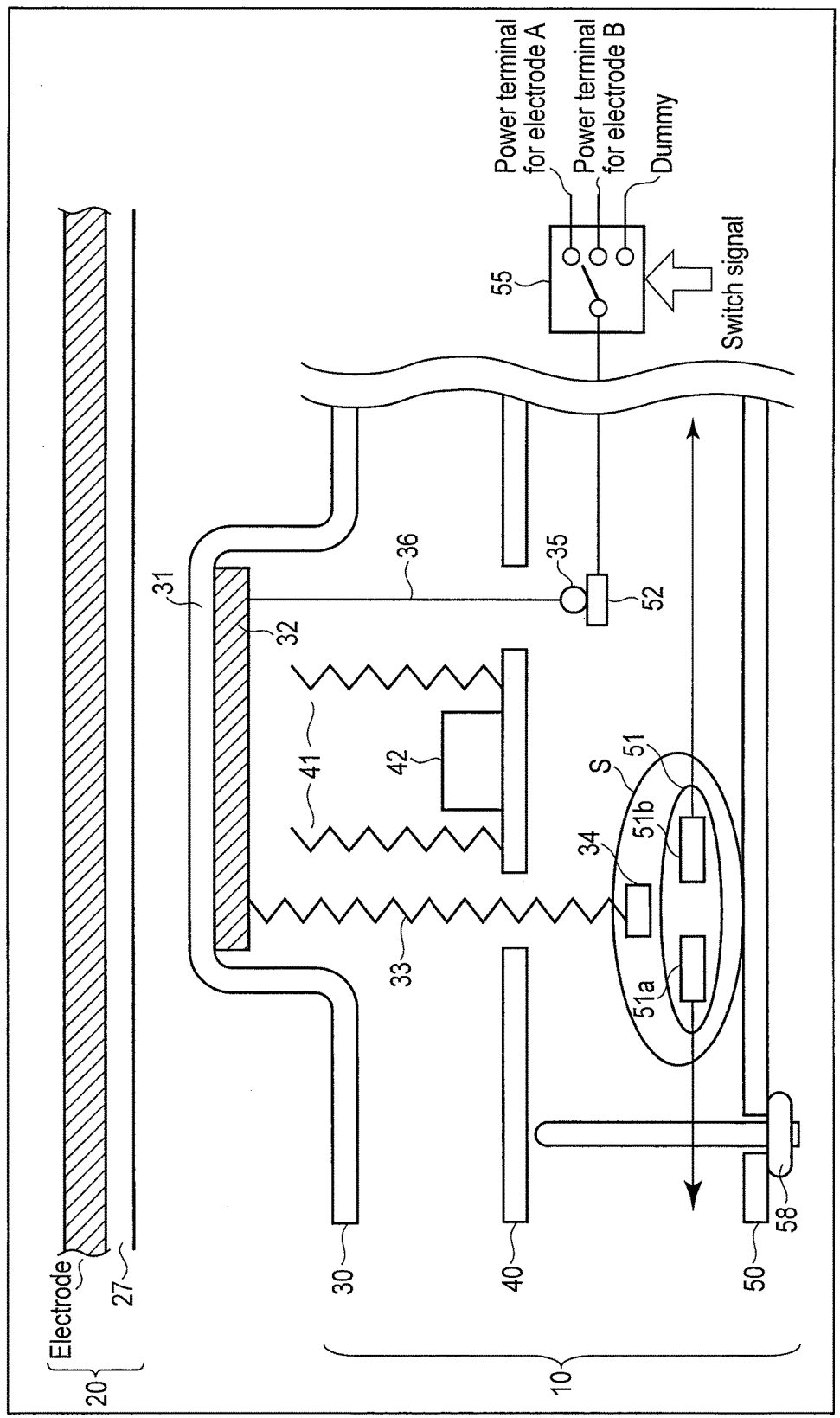
FIG. 7 is an exemplary diagram illustrating a detailed structure of the power feeder of the power feeding apparatus of the present embodiment.

FIG. 7 is an exemplary diagram illustrating a detailed structure of the power feeder of the power feeding apparatus of the present embodiment.

The power feeder 10 comprises a surface part 30, a base part 40 and a circuit part 50.

The surface opposed to the power receiving body 20 of the surface part 30 is covered by an insulator 31. The inside of the insulator 31 is provided with a small electrode 32. The small electrode 32 is connected to a contact point 34 via an elastic body 33 and is electrically connected to a contact point 35 via a conductor 36.

The surface opposed to the small electrode 32 of the base part 40 is provided with an elastic body 41 and a stopper 42. Also, the base part 40 is provided with a hole, through which the elastic body 33 and the conductor 36 penetrate.

The circuit part 50 comprises a printed wiring group. The surface opposed to the small electrode 32 of the circuit part 50 is provided with a sink detection switch 51 and a power supply terminal 52, which is further connected to a switch part 55. Also, a stopper position adjustment member 58 can be attached to the circuit part 50. The sink detection switch 51 includes two switches 51a and 51b, both of which are provided separately. Therefore, a sink detection sensor s constitutes the contact point 34 and the sink detection switch 51 (switches 51a and 51b).

Subsequently, the operation of the power feeder 10 will be described with reference to FIG. 7.

As mentioned above, when the power receiving apparatus 2 is mounted on the power feeder 10, the divided region that contacts with the protrusion 26 sinks. On the other hand, the surface of the divided region that does not contact with the protrusion 26 is pressed to the power receiving body 20 to get contacted. The small electrode 32 is then opposed to the electrode of the power feeder 10 via the insulator 31 and an insulator 27. It is possible to set the distance between the small electrode 32 with the electrode of the power feeder 10 to 0.8 mm or less by selecting the thickness of the insulator 31 and the insulator 27. It should be noted in this state that a capacitor is formed by the small electrode 32, the electrode of the power feeder 10, the insulator 31 and the insulator 27. On the other hand, in electric field coupling, it is possible to increase transmission power if the coupling capacitance can be increased. Therefore, it is important to select the material of the insulator 31 and the insulator 27.

The small electrode 32 descends in the direction of the base part 40 while receiving a force of repulsion of the elastic body 41, by being pressed by the power receiving body 20. The small electrode 32 descends by an amount corresponding to the amount sunk of the divided region and then stops. Therefore, the amount sunk of the divided region can be adjusted by changing the position of the stopper.

With the small electrode 32 descending, the contact points 34 and 35 connected thereto also descend. The contact point 34 descends and contacts with the switches 51a and 51b, and then the switches 51a and 51b are conducted. By detecting such conduction/non-conduction, it is possible to detect whether the small electrode 32 sinks. Also, when the contact point 35 descends and contacts with the power supply terminal 52, it is possible to supply the small electrode 32 with a power source.

The power supply terminal 52 is connected to a switch part 55 at the end portion of the power feeder 10. The switch part 55 is provided with three power terminals. The power supply terminal 52 is electrically connected to any of the three power terminals, based on a switch signal from the electrode individual control part 16 of the control module 11. To two of the three power terminals, a power wire from the power terminal for the electrode A of the power feeding source 13 and a power wire from the power terminal for the electrode B of the power feeding source 13 are connected. The remaining one power terminal is a dummy terminal, to which no power wire is connected.

By operating a stopper position adjustment member 58 provided in the power feeder 10, it is possible to adjust the amount sunk of the divided region and determine the distance between the stopper 42 and the small electrode 32. Therefore, it is possible to set this distance to an appropriate value according to the height of the protrusion 26.

It should be noted that spring, rubber, high-molecular compound having elasticity and the like can be used for the elastic bodies 33 and 41. Also, without being limited to a system illustrated in FIG. 7, it is possible to structure the sink detection sensor s so as to detect the contact of the contact point 34 by adopting a resistance film system used in a touch-panel.

Next, the feeding operation of the power feeding apparatus 1 will be described. In the power feeding apparatus 1 of the present embodiment, feeding automatically starts when the power receiving apparatus 2 is mounted whereas feeding automatically stops when the power receiving apparatus 2 is removed.

FIG. 8 is an exemplary flowchart illustrating power feeding operation of the power feeding apparatus of the present embodiment.

In step S01, the main control part 17 monitors whether sinking occurs based on a signal from the sink detection module 15. If sinking does not occur (S01, no), monitoring is continued.

If sinking occurs (S01, yes), in step S02, the main control part 17 identifies a divided region where sinking occurs. The size of the power feeder 10 is such that the protrusion 26 of the power receiving apparatus 2 is on the power feeder 10. Therefore, the position of the protrusion 26 can be identified from the position where sinking occurs. However, it is unclear how the power receiving apparatus 2 is mounted on the power feeder 10.

In step S03, the main control part 17 extracts a configuration pattern of the power receiving apparatus 2 stored in the storage module 12. This configuration pattern includes, as mentioned above, the arrangement pattern of the protrusion 26 of the power receiving apparatus 2 and the arrangement pattern of the electrodes A' and B'. In step S04, the main control part 17 examines the above-mentioned pattern corresponding in configuration to the pattern of the divided region where sinking occurs. It is possible to determine whether or not the configuration corresponds, if, for example, the correspondence rate satisfies a predetermined value in a comparison of an arrangement pattern between a pattern of parallel shift or rotation with the pattern of the divided region.

If there is no pattern in which configuration corresponds (S04, no), the processing is ended. That is, no feeding is performed. If there is a pattern in which configuration corresponds (S04, yes), the main control part 17 examines in step S05 whether there are a plurality of patterns in which configuration corresponds.

If the number of pattern in which configuration corresponds is only one (S05, no), the processing proceeds to step S07. If the number of pattern in which configuration corresponds is plural (S05, yes), an optimal pattern selection processing is executed, and then, the processing proceeds to step S07.

Figure 9:
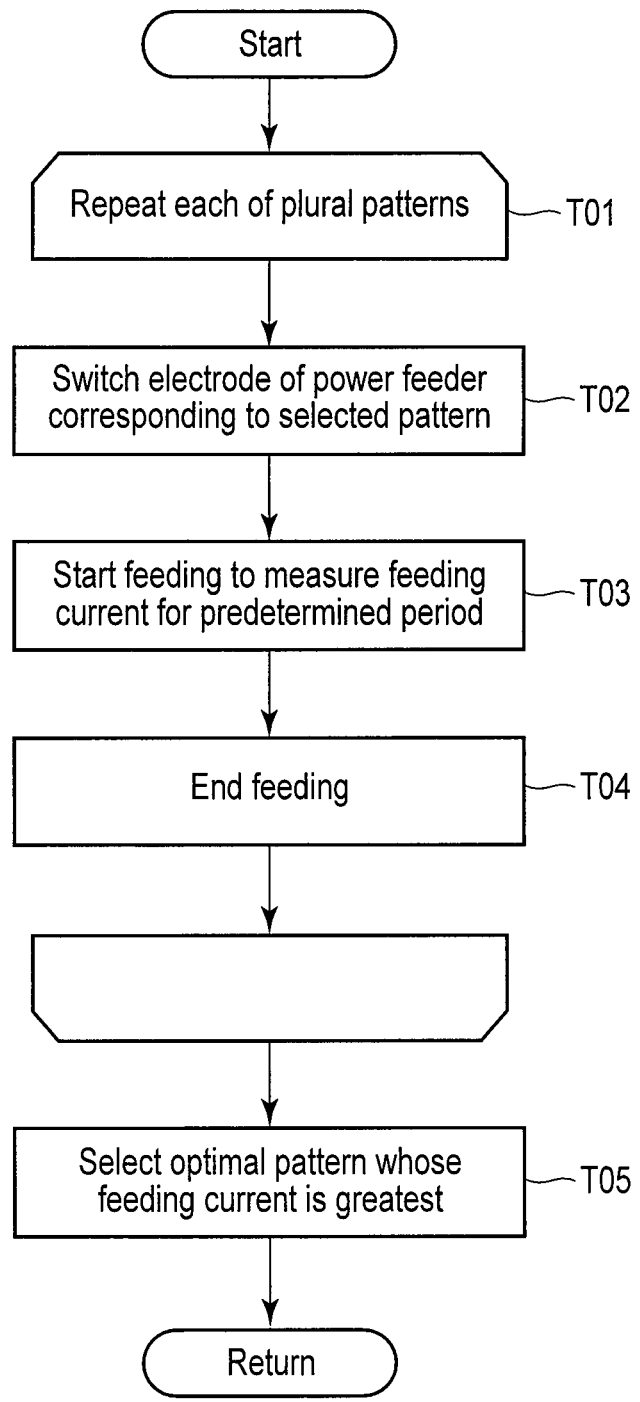
FIG. 9 is an exemplary flowchart illustrating optimal pattern selection processing of the power feeding apparatus of the present embodiment.

FIG. 9 is an exemplary flowchart illustrating optimal pattern selection processing of the power feeding apparatus of the present embodiment.

In FIG. 9, step T01, the main control part 17 repeatedly executes the processing of T02-T04 for each of the plurality of patterns.

In step T02, the main control part 17 corresponds the arrangement of the electrodes A' and B' of one pattern to the arrangement of the small electrode of the divided region. Then, in accordance with a relationship illustrated in FIG. 6, the main control part 17 determines whether or not each small electrode corresponds to either the electrode A' or B'. The electrode individual control part 16 switches the power terminal connected to each of the small electrodes by outputting a switch signal to the switch part 55.

In step T03, the main control part 17 reads stable feeding current after a predetermined period since feeding started. The feeding current can be sensed based on the current magnitude detected in the current detection module 14. In step T04, the feeding operation for this pattern is ended.

The main control part 17 repeatedly executes the processing of T02-T04 for a plurality of patterns, and then in step T05, makes a pattern whose feeding current is the largest an optimal pattern. After that, it returns to FIG. 8, step S06.

In FIG. 8, step S07, the main control part 17 switches the small electrode of the power feeder 10, corresponding to the arrangement of the electrode of the power receiving apparatus 2 shown as the optimal pattern. As this operation is the same as that of step T02 in FIG. 9, its detailed explanation will be omitted.

In step S08, the main control part 17 starts feeding. In step S09, the main control part 17 monitors whether sinking is maintained based on the signal from the sink detection module 15. When sinking is maintained (S09, yes), monitoring is continued.

When sinking is not maintained (S09, no), the main control part 17 examines in step S10 whether sinking does not exist.

When sinking occurs (S10, no), since the installation position of the power receiving apparatus 2 is altered, the processing from step S02 is executed again. When sinking does not occur (S10, yes), since the power receiving apparatus 2 is removed from the power feeder 10, feeding is ended in step S11.

According to the embodiments explained above, various kinds of advantages can be produced.

The power feeding apparatus 1 of the present embodiment can control how the small electrode of each divided region is switched from the relationship between the number and position of the divided region sunk, based on the pattern information set in advance. Therefore, it is possible to start effective feeding by switching the small electrode of each divided region of the power feeder in accordance with the arrangement of the electrodes of the power receiving body 20.

It is also possible to handle the power feeding apparatus 1 easily and user-friendly since feeding can be performed to pursue an optimal electrode arrangement, not by the kinds of power receiving apparatus and the shift in installation position.

The power feeding apparatus 1 can be applied to various objects, since the power receiving apparatus 2 is provided with a stopper so that the maximum amount of sinking of the divided region to the protrusion can be adjusted optionally.

It is possible to set the distance of the electrodes between the power feeder 10 and the power receiving body 20 to an optimal value, without being affected by the protrusion of the power receiving apparatus 2.

By using one power feeding apparatus, it is possible to feed power, corresponding to a plurality of power receiving apparatuses, which differ in body size, electrode position and the like.

In the above explanation, the terms employed for each of the components and blocks are merely examples. It goes without saying that the scope of the present invention is not exceeded even when the words are replaced with "device," "case," "block" and "module."

Also, regarding each constituting element of the claims, the scope of the present invention is not exceeded even when the constituting elements are divided for expression or when they are combined for expression. Further, even if the claims are recited as method, the apparatus of the present invention can be applied thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power feeding apparatus configured to feed power by electrical field coupling to a power receiving apparatus having a first electrode and a second electrode for receiving power arranged along a mounting surface and a protrusion arranged on a side of the mounting surface, comprising:
    a power feeder divided into a plurality of small regions having a small electrode respectively, the power receiving apparatus being mounted on the small regions; and
    a control module configured to supply power to the small electrodes corresponding to the first and second electrodes, wherein
    the small region in contact with the protrusion sinks when the power receiving apparatus is mounted, and the small region returns to an original position when the power receiving apparatus is removed.

2. The power feeding apparatus of claim 1, further comprising:
    a sink detection module configured to detect presence or absence of sinking of each of the small regions; and
    a storage module configured to store at least one arrangement pattern of the protrusion and the first and second electrodes of the power receiving apparatus.

3. The power feeding apparatus of claim 2, wherein
    the control module selects one arrangement pattern based on presence or absence of sinking of each of the small regions, and corresponds each of the small electrodes to the first electrode or the second electrode based on the selected arrangement pattern.

4. The power feeding apparatus of claim 3, wherein
    the control module pursues a first group of small electrodes overlapped with the first electrode and a second group of small electrodes overlapped with the second electrode in a plan view, and supplies power from one terminal of a power source to the first group of small electrodes and supplies power from other terminal of a power source to the second group of small electrodes.

5. The power feeding apparatus of claim 4, wherein
    the control module, when the power receiving apparatus is mounted, pursues a third group of electrodes that are not overlapped with the first and second electrodes in a plain view, and supplies no power from a power source to the third group of small electrodes.

6. The power feeding apparatus of claim 4, wherein
    the power feeding apparatus further comprises a current detection module configured to detect a feeding current while feeding power, wherein
    the control module, when selecting one arrangement pattern from a plurality of arrangement patterns, pursues the first and second groups of small electrodes corresponding to the respective arrangement patterns and selects an arrangement pattern in which a largest current magnitude is obtained, the current magnitude being detected from supply currents to supply power to the pursued first and second groups of small electrodes.

7. The power feeding apparatus of claim 4, wherein
    the control module starts supplying power to the first and second groups of electrodes when sinking of the small regions occurs, and stops supplying power to the first and second groups of electrodes when sinking of the small regions does not occur.

8. The power feeding apparatus of claim 1, wherein the small regions that contact with the protrusion sink when the power receiving apparatus is mounted, while the small regions that do not contact with the protrusion and are opposed to the first and second electrodes contact with the mounting surface of the power receiving apparatus.

9. The power feeding apparatus of claim 8, wherein
a distance between the first and second electrodes and the small electrode of the small region in contact with the mounting surface of the power receiving apparatus is 0.8 mm or less.

10. The power feeding apparatus of claim 1, further comprising:
a stopper configured to restrict an amount sunk of the small region in contact with the protrusion; and
an adjustment member configured to adjust a restriction position of the stopper.

11. A power feeding system having a power receiving apparatus and a power feeding apparatus configured to feed power by electrical field coupling to the power receiving apparatus, wherein
the power receiving apparatus has a first electrode and a second electrode for receiving power arranged along a mounting surface and a protrusion arranged on a side of the mounting surface, wherein
the power feeding apparatus comprises a power feeder divided into a plurality of small regions having a small electrode respectively, the power receiving apparatus being mounted on the small regions, and a control module configured to supply power to the small electrodes corresponding to the first and second electrodes, wherein
the small region in contact with the protrusion sinks when the power receiving apparatus is mounted, and the small region returns to an original position when the power receiving apparatus is removed.

12. The power feeding system of claim 11, further comprising:
a sink detection module configured to detect presence or absence of sinking of each of the small regions; and
a storage module configured to store at least one arrangement pattern of the protrusion and the first and second electrodes of the power receiving apparatus.

13. The power feeding system of claim 12, wherein
the control module selects one arrangement pattern based on presence or absence of sinking of each of the small regions, and corresponds each of the small electrodes to the first electrode or the second electrode based on the selected arrangement pattern.

14. The power feeding system of claim 13, wherein
the control module pursues a first group of small electrodes overlapped with the first electrode and a second group of small electrodes overlapped with the second electrode in a plan view, and supplies power from one terminal of a power source to the first group of small electrodes and supplies power from other terminal of a power source to the second group of small electrodes.

15. The power feeding system of claim 14, wherein
the control module, when the power receiving apparatus is mounted, pursues a third group of electrodes that are not overlapped with the first and second electrodes in a plain view, and supplies no power from a power source to the third group of small electrodes.

16. The power feeding system of claim 14, wherein
the power feeding apparatus further comprises a current detection module configured to detect a feeding current while feeding power, wherein
the control module, when selecting one arrangement pattern from a plurality of arrangement patterns, pursues the first and second groups of small electrodes corresponding to the respective arrangement patterns and selects an arrangement pattern in which a largest current magnitude is obtained, the current magnitude being detected from supply currents to supply power to the pursued first and second groups of small electrodes.

17. The power feeding system of claim 14, wherein
the control module starts supplying power to the first and second groups of electrodes when sinking of the small regions occurs, and stops supplying power to the first and second groups of electrodes when sinking of the small regions does not occur.

18. The power feeding system of claim 11, wherein
the small regions that contact with the protrusion sink when the power receiving apparatus is mounted, while the small regions that do not contact with the protrusion and are opposed to the first and second electrodes contact with the mounting surface of the power receiving apparatus.

19. The power feeding system of claim 18, wherein
a distance between the first and second electrodes and the small electrode of the small regions in contact with the mounting surface of the power receiving apparatus is 0.8 mm or less.

20. The power feeding system of claim 11, wherein the power feeding apparatus further comprises
a stopper configured to restrict an amount sunk of the small region in contact with the protrusion; and
an adjustment member configured to adjust a restriction position of the stopper.

* * * * *